(12) United States Patent
Wang et al.

(10) Patent No.: US 11,825,322 B2
(45) Date of Patent: Nov. 21, 2023

(54) MEASUREMENT CONTROL METHOD, TERMINAL, AND NON-TRANSITORY COMPUTER-READABLE STORAGE MEDIUM

(71) Applicant: GUANGDONG OPPO MOBILE TELECOMMUNICATIONS CORP., LTD., Guangdong (CN)

(72) Inventors: Shukun Wang, Guangdong (CN); Zhihua Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 235 days.

(21) Appl. No.: 17/471,360

(22) Filed: Sep. 10, 2021

(65) Prior Publication Data

US 2021/0409986 A1 Dec. 30, 2021

Related U.S. Application Data

(63) Continuation of application No. PCT/CN2019/090438, filed on Jun. 6, 2019.

(51) Int. Cl.
*H04W 24/08* (2009.01)
*H04L 5/00* (2006.01)

(52) U.S. Cl.
CPC ........... *H04W 24/08* (2013.01); *H04L 5/0048* (2013.01)

(58) Field of Classification Search
CPC ..... H04W 24/08; H04W 24/02; H04W 24/10; H04W 52/0212; H04L 5/0048;
(Continued)

(56) References Cited

U.S. PATENT DOCUMENTS

2018/0367346 A1\* 12/2018 Chen ..................... H04L 1/0026
2020/0169435 A1\* 5/2020 Kang .................. H04L 25/0226
(Continued)

FOREIGN PATENT DOCUMENTS

EP          3567759 A1    11/2019
WO     2014075532 A1     5/2014
(Continued)

OTHER PUBLICATIONS

Second Office Action of the Japanese application No. 2021-571702, dated May 16, 2023. 6 pages with English translation.
(Continued)

*Primary Examiner* — Afshawn M Towfighi
(74) *Attorney, Agent, or Firm* — PERKINS COIE LLP

(57) ABSTRACT

A method for controlling measurement includes that: the terminal receives a cross-link interference (CLI) measurement configuration from a network device, where the CLI measurement configuration includes at least one sounding reference signal (SRS) resource configuration, each of the at least one SRS resource configuration being associated with at least one of a cell identity or an SRS index; and the terminal performs a CLI measurement according to the CLI measurement configuration, where the CLI measurement refers to that the terminal measures an SRS of another terminal. A terminal and a non-transitory computer-readable storage medium are also provided.

14 Claims, 10 Drawing Sheets

(58) Field of Classification Search
CPC ..... H04L 43/16; H04B 17/327; H04B 17/345; H04B 17/309; H04B 17/318; H04B 17/336; Y02D 30/70
See application file for complete search history.

(56) References Cited

U.S. PATENT DOCUMENTS

| | | | | |
|---|---|---|---|---|
| 2020/0389805 | A1* | 12/2020 | Kim | H04W 72/23 |
| 2021/0006997 | A1* | 1/2021 | Jin | H04L 27/2602 |
| 2022/0240152 | A1* | 7/2022 | Park | H04W 76/12 |

FOREIGN PATENT DOCUMENTS

| | | | |
|---|---|---|---|
| WO | 2018126792 | A1 | 7/2018 |
| WO | 2018128297 | A1 | 7/2018 |
| WO | 2018175224 | A1 | 9/2018 |
| WO | 2019031816 | A1 | 2/2019 |
| WO | 2019032031 | A1 | 2/2019 |

OTHER PUBLICATIONS

Decision of Refusal of the Chinese application No. 202110577075.6, dated Mar. 1, 2023. 12 pages with English translation.
3GPP TS 38.300 V16.3.0 (Sep. 2020), 3rd Generation Partnership Project; Technical Specification Group Radio Access Network; NR; NR and NG-RAN Overall Description; Stage 2 (Release 16).
3GPP TS 38.331 V16.2.0 (Sep. 2020), 3rd Generation Partnership Project; Technical Specification Group Radio Access Network; NR; Radio Resource Control (RRC) protocol specification (Release 16).
Huawei, Hisilicon. "UE-to-UE measurement for cross-link interference mitigation" 3GPP TSG RAN WG1 Meeting #92, R1-1801798, Feb. 16, 2018 (Feb. 16, 2018), see sections 1, 3.1, 3.3, and 4.
Huawel, Hisilicon. "UE-to-UE measurement for cross-link interference mitigation" 3GPP TSG RAN WG1 Ad Hoc Meeting, R1-1800051, Jan. 12, 2018 (Jan. 12, 2018), see sections 1.3.1.3.3. and 4.
Huawei, Hisilicon."UE-to-UE measurement for cross-link interference mitigation" 3GPP TSG RAN WG1 Meeting #91, R1-1719835, Nov. 18, 2017 (Nov. 18, 2017), see sections 1.3.1.3.3. and 4.
Huawei, Hisilicon. "UE-to-UE measurement for cross-link interference mitigation" 3GPP TSG RAN WG1 Meeting #90bis, R1-1717907, Oct. 2, 2017 (Oct. 2, 2017), see sections 1, 3.1 and 3.3.
Huawei, Hisilicon. "UE-to-UE measurement for cross-link interference mitigation" 3GPP TSG RAN WG1 Meeting NR#3, R1-1715422, Sep. 21, 2017 (Sep. 21, 2017), see sections 1, 3.1 and 3.3.
ZTE, "UE-to-UE measurement as an enabler for CLI mitigation schemes" 3GPP TSG RAN WGI Meeting #90, R1-1712281, Aug. 11, 2017 (Aug. 11, 2017), see section 2.1.
International Search Report in the international application No. PCT/CN2019/090438, dated Feb. 27, 2020.
Second Office Action of the Chinese application No. 202110577075.6, dated Dec. 7, 2022. 16 pages with English translation.
Second Office Action of the European application No. 19931676.1, dated Jan. 3, 2023. 4 pages.
Ericsson, "Overview on RAN2 aspects for CLI", 3GPP TSG RAN WG2 #105bis, R2-1905135, Apr. 8-12, 2019. 4 pages.
First Office Action of the Japanese application No. 2021-571702, dated Feb. 10, 2023. 10 pages with English translation.
CMCC: "Discussion on UE-UE cross link interference measurements and reporting", 3GPP Draft; R1-1900408, 3rd Generation Partnership Project (3GPP), vol. RAN WG1, No. Taipei; Jan. 21, 2019-Jan. 25, 2019 Jan. 20, 2019 (Jan. 20, 2019), XP051593322. 8 pages.
Ericsson: "Considerations on SRS-RSRP measurements for CLI", 3GPP Draft; R4-1904303 Considerations On SRS-RSRP Measurements for CLI, 3rd Generation Partnership Project (3GPP), vol. RAN WG4, No. Xi ' an, China; Apr. 1, 2019, XP051714644. 4 pages.
Huawei et al: "CLI measurements configuration and reporting", 3GPP Draft; R2-1907399 CLI Measurements Configuration and Reporting, 3rd Generation Partnership Project (3GPP), vol. RAN WG2, No. Reno, USA; May 13, 2019, XP051730838. 5 pages.
Nokia et al: "Details of UE CLI measurements", 3GPP Draft; R1-1902672 Details of UE CLI Measurements, 3rd Generation Partnership Project (3GPP), vol. RAN WG1, No. Athens, Greece; Feb. 25, 2019-Mar. 1, 2019 Feb. 15, 2019 (Feb. 15, 2019), XP051600367. 9 pages.
Supplementary European Search Report in the European application No. 19931676.1, dated Feb. 4, 2022. 11 pages.
Written Opinion of the International Search Authority in the international application No. PCT/CN2019/090438, dated Feb. 27, 2020. 9 pages with English translation.
First Office Action of the European application No. 19931676.1, dated Aug. 1, 2022.
Office Action of the Indian application No. 202127047175, dated Jun. 16, 2022.
First Office Action of the Chinese application No. 202110577075.6, dated Sep. 2, 2022.
Huawei, Hisilicon. "UE-to-UE measurement for cross-link interference mitigation" 3GPP TSG RAN WG1 Meeting #92, R1-1801798, Feb. 16, 2018 (Feb. 16, 2018).

* cited by examiner

MEASUREMENT CONTROL METHOD, TERMINAL, AND NON-TRANSITORY COMPUTER-READABLE STORAGE MEDIUM

TECHNICAL FIELD

Embodiments of the present disclosure relate to the technical field of mobile communications, and in particular to a method for controlling measurement, a terminal, and a non-transitory computer-readable storage medium.

BACKGROUND

Interference may occur between two terminals located in different cells, and such interference is referred to as cross-link interference (CLI). In Release 16 (R16), user equipment to user equipment (UE-to-UE) measurement for the CLI is introduced, which is called CLI measurement. The CLI measurement means that a terminal measures a sounding reference signal (SRS) of another terminal to discover interference.

SUMMARY

Aspects of the present disclosure provide a method for controlling measurement, a terminal, and a non-transitory computer-readable storage medium.

In a first aspect, a method for controlling measurement is provided, which includes that:

a terminal receives a CLI measurement configuration from a network device, herein the CLI measurement configuration includes at least one SRS resource configuration, each of the at least one SRS resource configuration is associated with at least one of a cell identity or an SRS index; and the terminal performs a CLI measurement according to the CLI measurement configuration, herein the CLI measurement refers to that the terminal measures an SRS of another terminal.

In a second aspect, a terminal is provided. The terminal includes a processor and a memory for storing a computer program, the processor is configured to: receive, through a transceiver, a cross-link interference (CLI) measurement configuration from a network device, where the CLI measurement configuration includes at least one sounding reference signal (SRS) resource configuration, each of the at least one SRS resource configuration being associated with at least one of a cell identity or an SRS index; and perform a CLI measurement according to the CLI measurement configuration, the CLI measurement referring to that the terminal measures an SRS of another terminal.

In a second aspect, a non-transitory computer-readable storage medium having stored therein a computer program that, when executed by a computer, causes the computer to perform the above-described method for controlling measurement.

BRIEF DESCRIPTION OF THE DRAWINGS

The accompanying drawings described herein are intended to provide a further understanding of the present disclosure and form a part of the present disclosure. The illustrative embodiments of the present disclosure and the description thereof are intended to explain the present disclosure and do not constitute an undue limitation on the present disclosure. The drawings are as follows.

DETAILED DESCRIPTION

The technical solutions in the embodiments of the present disclosure will be described below with reference to the accompanying drawings in the embodiments of the present disclosure. It is apparent that, the described embodiments are some but not all of the embodiments of the present disclosure. Based on the embodiments of the present disclosure, all other embodiments obtained by those of ordinary skill in the art without creative effort shall fall within the scope of the protection of the present disclosure.

In the related art, how to control the performance of such the CLI measurement and reporting of a measurement result is a problem to be solved.

The technical solutions of the embodiments of the present disclosure may be applied to various communication systems, such as a Global System of Mobile Communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, or a 5G system.

Figure 1:
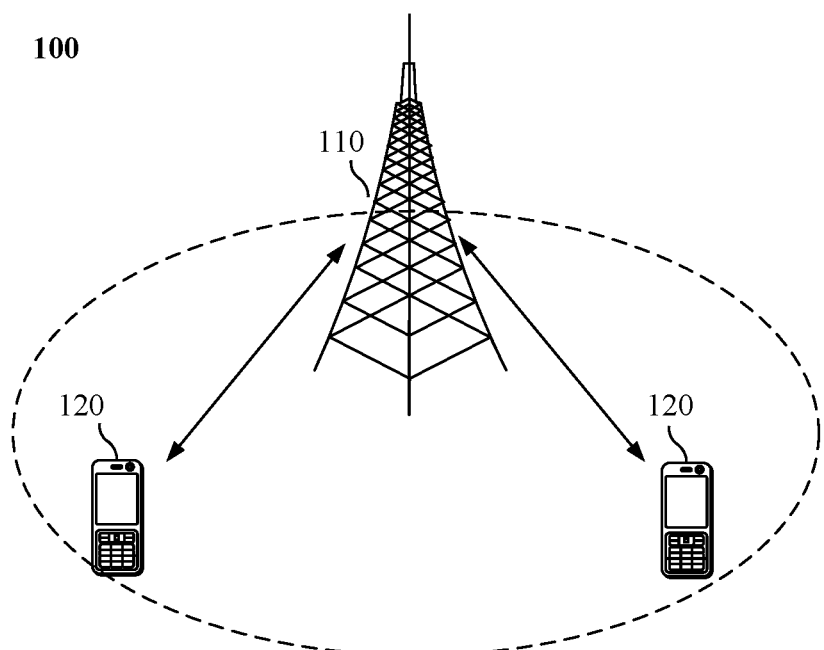
FIG. 1 is a schematic diagram of a communication system architecture according to an embodiment of the present disclosure.

Exemplarily, the communication system 100 to which the embodiment of the present disclosure is applied is shown in FIG. 1. The communication system 100 may include a network device 110, which may be a device in communication with a terminal 120 (or referred to as a communication terminal, or a terminal). The network device 110 may provide communication coverage for a particular geographic area and may communicate with terminals located within the coverage area. Optionally, the network device 110 may be a base transceiver station (BTS) in a GSM system or a CDMA system, or a NodeB (NB) in a WCDMA system, an Evolutional Node B (eNB or eNodeB) in an LTE system, or a radio controller in a cloud radio access network (CRAN), or the network device may be a mobile switching center, a relay station, an access point, a vehicle-mounted device, a wearable device, a hub, a switch, a bridge, a router, a network-side device in a 5G network, a network device in a future evolved public land mobile network (PLMN), or the like.

The communication system 100 further includes at least one terminal 120 located within the coverage of the network device 110. "Terminal" as used herein includes but is not limited to an apparatus that is configured to receive or send communication signals via wired line connections, such as via Public Switched Telephone Networks (PSTN), Digital Subscriber Lines (DSL), digital cables, direct cable connections and/or another data connections/networks; and/or via wireless interfaces, such as wireless interfaces configured for cellular networks, wireless local area networks (WLAN), like digital TV network of DVB-H networks, satellite networks, AM-FM broadcast transmitters and/or another terminal and/or Internet of Things (IoT) device. A terminal set to communicate via a wireless interface may be referred to as a "wireless communication terminal", a "wireless terminal" or a "mobile terminal". Examples of mobile terminals include but are not limited to satellites or cellular phones; Personal Communications System (PCS) terminals that can combine cellular radio phones with data processing, fax, and data communication capabilities; PDA that includes radio phones, pagers, Internet/intranet access, Web browser, memo pad, calendar, and/or Global Positioning System (GPS) receiver; and conventional laptop and/or palmtop receivers or other electronic apparatuses including radio telephone transceivers. The terminal may refer to access terminals, user equipment (UE), user units, user stations, mobile stations, mobile platforms, remote stations, remote terminals, mobile device, user terminals, terminals, wireless communication device, user agents or user apparatuses. The access terminals may be cellular phones, cordless phones, Session Initiation Protocol (SIP) phones, Wireless Local Loop (WLL) stations, personal digital assistants (PDA), handheld devices with wireless communication functions, computing devices or other processing devices connected to wireless modems, in-vehicle devices, wearable devices, terminals in 5G networks, or terminals in the future enhanced PLMN, etc.

In an embodiment, a Device to Device (D2D) communication may be performed between terminals 120.

In an embodiment, the 5G system or the 5G network may also be referred to as a new wireless (NR) system or an NR network.

One network device and two terminals are exemplarily shown in FIG. 1. In an example, the communication system 100 may include a plurality of network devices and other numbers of terminals may be included within a coverage area of each network device, which is not limited in the embodiment of the present disclosure.

In an example, the communication system 100 may further include a network controller, a mobility management entity, and other network entities, which are not limited in the embodiment of the present disclosure.

It should be understood that a device having a communication function in a network/system in the embodiments of the present disclosure may be referred to as a communication device. Taking the communication system 100 shown in FIG. 1 as an example, the communication device may include a network device 110 and terminals 120 having communication functions. The network device 110 and the terminals 120 may be specific devices described above, and details are not described herein. The communication device may further include other devices in the communication system 100, such as a network controller, a mobility management entity, and other network entities, which are not limited in the embodiment of the present disclosure.

It should be understood that the terms "system" and "network" are commonly used interchangeably herein. The term "and/or" herein is only an association describing associated objects, which means that there may be three relationships. For example "A and/or B" may have three meanings: A exists alone, A and B exist at the same time, and B exists alone. In addition, the character "/" herein generally indicates that the associated objects before and after the character "/" are in an "or" relationship.

To facilitate the understanding of the technical solutions of the embodiments of the present disclosure, the following describes the related technologies of the embodiments of the present disclosure.

Between two terminals located in different cells, there may be interference with each other, which is called CLI. For example, at the edges of two cells (a cell 1 and a cell 2, respectively), there are two terminals (a terminal 1 and a terminal 2, respectively), herein the terminal 1 is located in the cell 1 and the terminal 2 is located in the cell 2. The uplink transmission of the terminal 1 may correspond to the downlink reception of the terminal 2, resulting in the uplink transmission of the terminal 1 interfering with the downlink reception of the terminal 2, which causes the CLI between the terminal 1 and the terminal 2.

In a time division duplexing (TDD) mode, the ratio of Up Link (UL) to Down Link (DL) may be statically configured or dynamically configured. The Release 15 (R15) NR specification supports mechanisms that allow dynamic DL/UL allocation. However, without specifying any mitigation techniques and coexistence requirements for the CLI, the use of dynamic DL/UL allocation operations is greatly limited. The flexibility of duplexing with the capability of preventing CLI provides better user throughput than static UL/DL operations or dynamic UL/DL operations without the capability of preventing interference.

The R16 agrees to introduce UE-to-UE measurement for the CLI, the UE-to-UE measurement refers to the CLI measurement in the following embodiments of the present disclosure. The CLI measurement mainly refers to that the terminal measures the SRS of another terminal to discover interference. However, only the two terminals of two neighboring cells will have CLI problems, so it is not necessary for the terminals located at the center of the cell to perform the CLI measurement and the reporting of the measurement results, otherwise a problem of electricity consumption will occur. How to effectively control the execution of the CLI measurement and the reporting of the measurement result is a problem to be solved. To solve this problem, the following technical solutions of the embodiments of the present disclosure are proposed.

Figure 2:
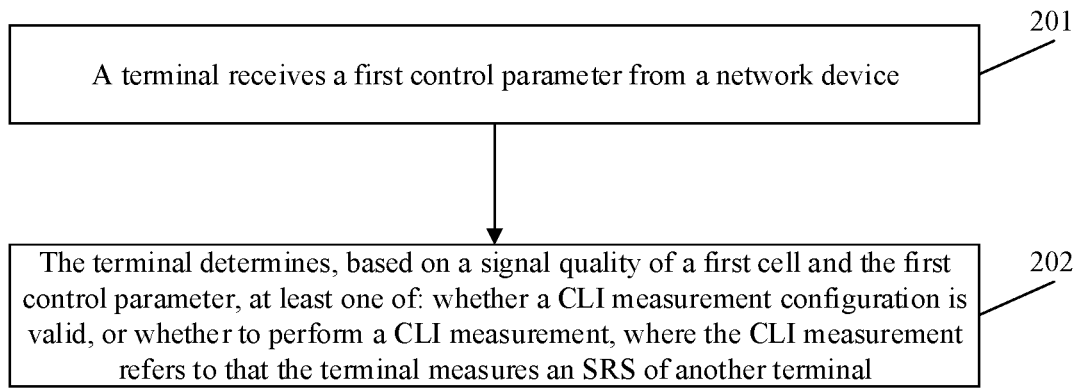
FIG. 2 is a first flowchart of a method for controlling measurement according to an embodiment of the present disclosure.

FIG. 2 is a first flowchart of a method for controlling measurement according to an embodiment of the present disclosure. As shown in FIG. 2, the method for controlling measurement includes the following operations.

In 201, a terminal receives a first control parameter from a network device.

In the embodiments of the present disclosure, the terminal is any device capable of communicating with a network, such as a mobile phone, a tablet computer, a notebook, a vehicle-mounted terminal, or a wearable device.

In the embodiments of the present disclosure, in some alternative implementations, the network device may be a base station.

In an embodiment of the present disclosure, the first control parameter is used by the terminal to determine at least one of: whether the CLI measurement configuration is valid, or whether to perform the CLI measurement.

Herein, the CLI measurement configuration refers to a measurement configuration associated with the CLI, and in an implementation, the CLI measurement configuration includes at least one SRS resource configuration, each of the at least one SRS resource configuration is associated with at least one of a cell identity or an SRS index. It should be noted that the cell identity associated with the SRS resource configuration is used for identifying a cell configured with the SRS resource configuration, and the SRS index associated with the SRS resource configuration is used for identifying an SRS corresponding to the SRS resource configuration. For example, the CLI measurement configuration includes three SRS resource configurations, namely, an SRS resource configuration 1, an SRS resource configuration 2 and an SRS resource configuration 3. Herein, the SRS resource configuration 1 is associated with the cell 1 and an SRS1, the SRS resource configuration 2 is associated with the cell 1 and an SRS2, and the SRS resource configuration 3 is associated with the cell 2 and an SRS3. It can be seen that the cell 1 is configured with the SRS resource configuration 1 and the SRS resource configuration 2, and the cell 2 is configured with the SRS resource configuration 3. In addition, the SRS resource configuration 1 corresponds to the resource configuration of the SRS1, the SRS resource configuration 2 corresponds to the resource configuration of the SRS2, and the SRS resource configuration 3 corresponds to the resource configuration of the SRS3. The base station may deliver multiple SRS resource configurations (i.e., CLI measurement configuration) that multiple cells (which may be different cells within the same base station, or may be different cells within different base stations) are configured with to the terminal.

In 202, the terminal determines, based on a signal quality of a first cell and the first control parameter, at least one of: whether a CLI measurement configuration is valid, or whether to perform a CLI measurement, herein the CLI measurement refers to that the terminal measures an SRS of another terminal.

In the embodiments of the present disclosure, the first control parameter may be implemented in the following two manners.

In a first manner, the first control parameter is a first measurement threshold, and the first measurement threshold is an execution control parameter of CLI measurement.

Specifically, the terminal measures a signal quality of a serving cell; when the signal quality of the serving cell is less than the first measurement threshold, the terminal performs CLI measurement for a CLI measurement configuration; or when the signal quality of the serving cell is greater than or equal to the first measurement threshold, the terminal stops the CLI measurement for a CLI measurement configuration.

Herein, the signal quality includes at least one of a reference signal received power (RSRP), a reference signal received quality (RSRQ), or a signal to interference plus noise ratio (SINR).

Accordingly, the first measurement threshold includes at least one of an RSRP threshold, an RSRQ threshold, or an SINR threshold.

In a second manner, the first control parameter is a second measurement threshold, the second measurement threshold is associated with a cell identity of a neighboring cell, and the second measurement threshold is a validity control parameter of a CLI measurement configuration.

Specifically, the terminal measures a signal quality of a neighboring cell; when the signal quality of the neighboring cell is greater than or equal to the second measurement threshold, the terminal determines that the CLI measurement configuration associated with the cell identity is valid; or when the signal quality of the neighboring cell is less than the second measurement threshold, the terminal determines that the CLI measurement configuration associated with the cell identity is invalid.

Herein, the signal quality includes at least one of an RSRP, an RSRQ or an SINR. Accordingly, the second measurement threshold includes at least one of an RSRP threshold, an RSRQ threshold or an SINR threshold.

Furthermore, the terminal performs CLI measurement for the CLI measurement configuration when the CLI measurement configuration is valid; or the terminal stops the CLI measurement for the CLI measurement configuration when the CLI measurement configuration is invalid.

In the technical solutions of the embodiments of the present disclosure, the network device delivers the first control parameter to the terminal, and according to the measurement result and the first control parameter, the terminal determines at least one of: whether the CLI measurement configuration is valid, or whether to perform the CLI measurement, thereby effectively controlling the execution of the CLI measurement.

Through the above technical solution, by effectively controlling the execution of CLI measurement, energy consumption of the terminal is saved. On the other hand, how to configure the CLI measurement configuration and how to trigger the reporting of the measurement result are clarified. Furthermore, the content of the measurement reporting is also clarified, so that the communication interference caused by the CLI can be avoided.

Figure 3:
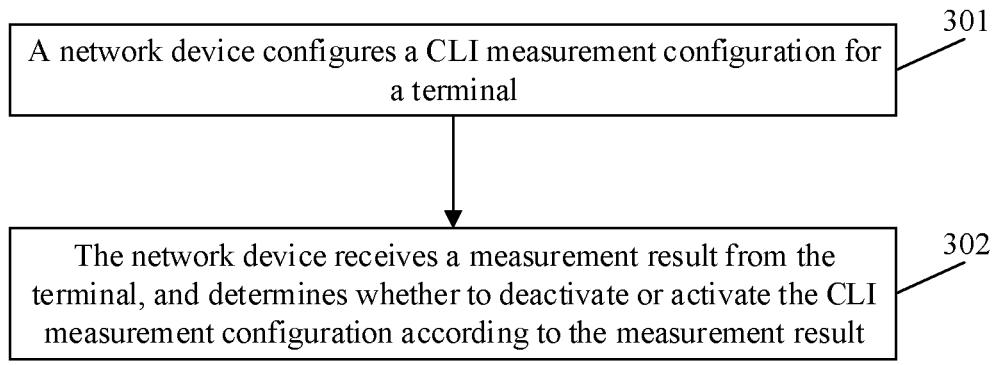
FIG. 3 is a second flowchart of a method for controlling measurement according to an embodiment of the present disclosure.

FIG. 3 is a second flowchart of a method for controlling measurement according to an embodiment of the present disclosure. As shown in FIG. 3, the method for controlling measurement includes the following operations.

In 301, a network device configures a CLI measurement configuration for a terminal.

In the embodiments of the present disclosure, in some alternative implementations, the network device may be a base station.

In the embodiments of the present disclosure, the terminal is any device capable of communicating with a network, such as a mobile phone, a tablet computer, a notebook, a vehicle-mounted terminal, or a wearable device.

In an embodiment of the present disclosure, the CLI measurement configuration refers to a measurement configuration associated with the CLI, and in an implementation, the CLI measurement configuration includes at least one SRS resource configuration, each of the at least one SRS resource configuration is associated with at least one of a cell identity or an SRS index. It should be noted that the cell identity associated with the SRS resource configuration is used for identifying a cell configured with the SRS resource configuration, and the SRS index associated with the SRS resource configuration is used for identifying the SRS corresponding to the SRS resource configuration. The base station may deliver multiple SRS resource configurations (i.e., CLI measurement configurations) that multiple cells (which may be different cells within the same base station, or may be different cells within different base stations) are configured with to the terminal.

Herein, the SRS index is unique within the CLI measurement configuration or is unique within the cell identity.

In 302, the network device receives a measurement result from the terminal, and determines whether to deactivate or activate the CLI measurement configuration according to the measurement result.

In the embodiment of the present disclosure, the measurement result sent by the terminal may be implemented by a measurement report, i.e., MeasurmentReport. The measurement result sent by the terminal is used by the network device to determine whether to deactivate or activate the CLI measurement configuration. Specifically, the network device may determine whether to deactivate or activate the CLI measurement configuration in following two manners.

In a first manner, the network device receives a measurement result of the serving cell sent by the terminal; when the measurement result of the serving cell is less than a first measurement threshold, the network device determines to activate the CLI measurement configuration; or when the measurement result of the serving cell is greater than or equal to a first measurement threshold, the network device determines to deactivate the CLI measurement configuration.

Herein, the measurement result includes a measurement result of at least one of the following signal quality: an RSRP, an RSRQ or an SINR.

In a second manner, the network device receives a measurement result of the neighboring cell sent by the terminal; when a signal quality of the neighboring cell is greater than or equal to a second measurement threshold, the network device determines to activate the CLI measurement configuration; or when a signal quality of the neighboring cell is less than a second measurement threshold, the network device determines to deactivate the CLI measurement configuration.

Herein, the measurement result includes a measurement result of at least one of the following signal quality: an RSRP, an RSRQ or an SINR.

In some alternative implementations of the present disclosure, the network device sends a deactivation instruction or an activation instruction of the CLI measurement configuration to the terminal, and the deactivation instruction or the activation instruction is carried in one of the following: a radio resource control (RRC) signaling, a media access control control element (MAC CE), or a physical downlink control channel (PDCCH).

In some alternative implementations of the present disclosure, the deactivation instruction or the activation instruction carries at least one of an identifier of a CLI measurement configuration, a cell identity, or an SRS index.

It should be noted that the information carried in the deactivation instruction or the activation instruction is used by the terminal to determine which CLI measurement configuration or which part of the CLI measurement configuration is deactivated or activated.

In the embodiment of the present disclosure, after the terminal activates the CLI measurement configuration, the CLI measurement configuration is in a valid state; after the terminal deactivates the CLI measurement configuration, the CLI measurement configuration is in an invalid state.

In the technical solution of the embodiment of the present disclosure, the terminal reports the measurement result to the network device, and the network device determines whether to deactivate or activate the CLI measurement configuration according to the measurement result, thereby effectively controlling the execution of the CLI measurement on the terminal side.

Figure 4:
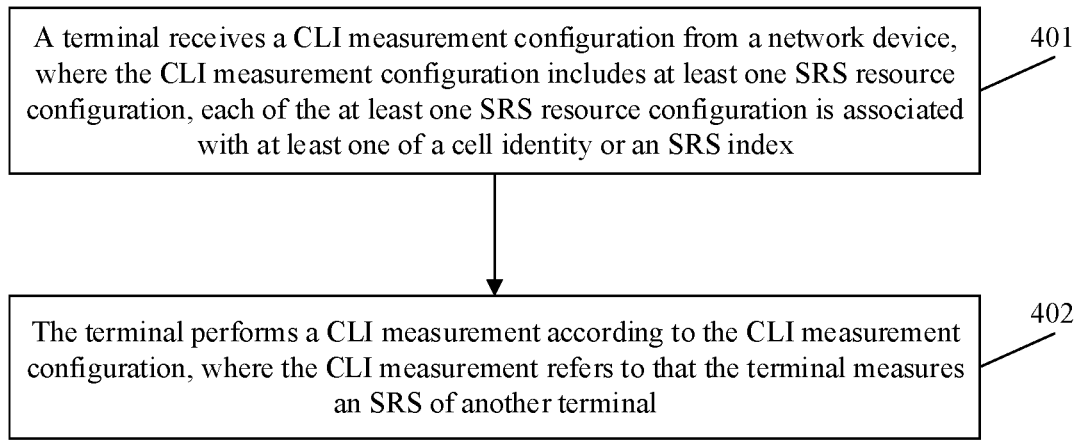
FIG. 4 is a third flowchart of a method for controlling measurement according to an embodiment of the present disclosure.

FIG. 4 is a third flowchart of a method for controlling measurement according to an embodiment of the present disclosure. As shown in FIG. 4, the method for controlling measurement includes the following operations.

In 401, a terminal receives a CLI measurement configuration from a network device, herein the CLI measurement configuration includes at least one SRS resource configuration, each of the at least one SRS resource configuration is associated with at least one of a cell identity or an SRS index.

In the embodiments of the present disclosure, the terminal is any device capable of communicating with a network, such as a mobile phone, a tablet computer, a notebook, a vehicle-mounted terminal, or a wearable device.

In the embodiments of the present disclosure, in some alternative implementations, the network device may be a base station.

In an embodiment of the present disclosure, the CLI measurement configuration refers to a measurement configuration associated with the CLI. In an implementation, the CLI measurement configuration includes at least one SRS resource configuration, each of the at least one SRS resource configuration is associated with at least one of a cell identity or an SRS index. It should be noted that the cell identity associated with the SRS resource configuration is used for identifying a cell configured with the SRS resource configuration, and the SRS index associated with the SRS resource configuration is used for identifying an SRS corresponding to the SRS resource configuration. The base station may deliver multiple SRS resource configurations (i.e., CLI measurement configurations) that multiple cells (which may be different cells within the same base station, or may be different cells within different base stations) are configured with to the terminal.

In some alternative implementations of the present disclosure, the network device delivers a CLI measurement configuration to the terminal via a dedicated signaling, such as an RRC signaling.

In the embodiment of the present disclosure, configuring, by the network device, the CLI measurement configuration may have the following implementation manners.

1) In the CLI measurement configuration, each SRS resource corresponds to a respective measurement object (MO), herein the measurement object includes an SRS resource configuration.

2) In the CLI measurement configuration, all SRS resources correspond to a measurement object, herein the measurement object includes a set of SRS resource configurations.

3) In the CLI measurement configuration, all SRS resources associated with a cell correspond to a measurement object, herein the measurement object includes a set of SRS resource configurations.

In 402, the terminal performs a CLI measurement according to the CLI measurement configuration, herein the CLI measurement refers to that the terminal measures an SRS of another terminal.

A) In an embodiment, when the CLI measurement configuration is configured according to the manner 1) in the operation 401, the terminal performs measurement according to the SRS resource configuration to obtain a measurement result of an SRS; when the measurement result meets a threshold condition configured by the network device, the terminal waits for time T; if the measurement result still meets the threshold condition within the time T, the terminal reports the measurement result to the network device, herein a value of the T is greater than or equal to 0.

Herein, the measurement result meets a threshold condition configured by the network device includes that: the measurement result is greater than or equal to a first threshold configured by the network device; or the measurement result is less than or equal to a first threshold configured by the network device.

For example, the terminal compares the measurement result of an SRS with a first threshold configured by the network device; 1) when the measurement result is greater than or equal to the first threshold, the terminal waits for time T; if the measurement result is still greater than or equal to the first threshold within the time T, the terminal triggers reporting of the measurement result; or 2) when the measurement result is less than or equal to the first threshold, the terminal waits for time T; if the measurement result is still less than or equal to the first threshold within the time T; the terminal triggers reporting of the measurement result. Furthermore, the T may be 0 or a non-0 positive number.

Herein, a content reported by the terminal to the network device includes at least one of a measurement result of an SRS-RSRP, a measurement result of an SRS-RSRQ, or a measurement result of an SRS-SINR associated with an identifier of each CLI measurement configuration.

B) In another embodiment, when the CLI measurement configuration is configured according to the manner 2) or manner 3) in operation 401, the terminal performs measurement according to the set of SRS resource configurations to obtain measurement results of a set of SRSs; when a measurement result of at least one SRS in the measurement results of the set of SRSs meets the threshold condition configured by the network device, the terminal waits for time T; if the measurement result still meets the threshold condition within the time T, the terminal reports the measurement result to the network device, herein the value of the T is greater than or equal to 0.

Herein, the measurement result meets a threshold condition configured by the network device includes that: the measurement result is greater than or equal to a first threshold configured by the network device; or the measurement result is less than or equal to a first threshold configured by the network device.

For example, the terminal compares measurement results of a set of SRSs with a first threshold configured by the network device: 1) when the measurement result of at least one SRS is greater than or equal to the first threshold, the terminal waits for time T; if the measurement result is still greater than or equal to the first threshold within the time T, the terminal triggers reporting of the measurement result; or 2) when the measurement result of at least one SRS is less than or equal to the first threshold, the terminal waits for time T; if the measurement result is still less than or equal to the first threshold within the time T, the terminal triggers reporting of the measurement result. Furthermore, T may be 0 or a non-0 positive number.

Herein, the content reported by the terminal to the network device includes at least one of a measurement result of an SRS-RSRP, a measurement result of an SRS-RSRQ or a measurement result of an SRS-SINR associated with each SRS index; or a list of SRS indexes whose measurement results meet a threshold condition configured by the network device, for example, a list of SRS indexes whose measurement results are greater than or equal to a first threshold or a list of SRS indexes whose measurement results are less than or equal to a first threshold.

Furthermore, in some alternative implementations of the present disclosure, the content reported by the terminal to the network device further includes a cell identity associated with a measurement result of the SRS, and the cell identity is identical to a cell identity associated with an SRS resource configuration corresponding to the measurement result.

Furthermore, in some alternative implementations of the present disclosure, the content reported by the terminal to the network device further includes a measurement identifier associated with the measurement configuration of the SRS. Herein, the measurement configuration of the SRS refers to a measurement configuration related to the SRS in the CLI measurement configuration. For example, the measurement configuration of the SRS includes a resource configuration of the SRS.

In the technical solutions of the embodiments of the present disclosure, how the network device configures the CLI measurement configuration for the terminal is clarified, and how the terminal triggers the reporting of the measurement result and the specific content of the reporting are clarified.

Figure 5:
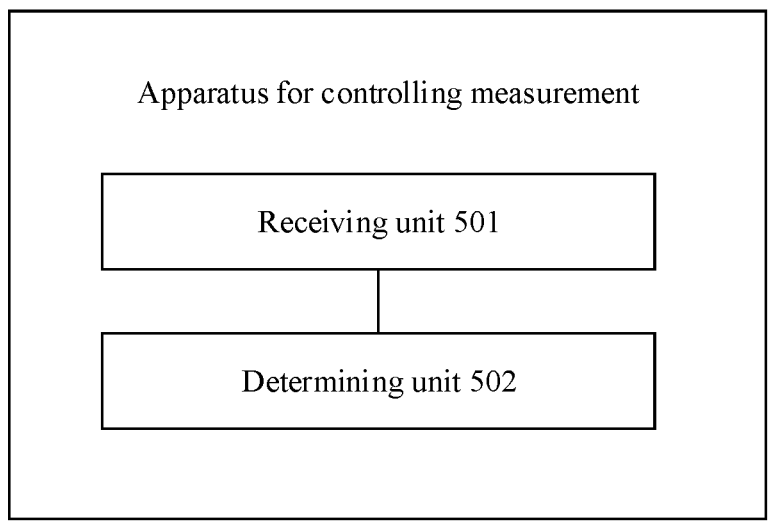
FIG. 5 is a first schematic structural diagram of an apparatus for controlling measurement according to an embodiment of the present disclosure.

FIG. 5 is a first schematic structural diagram of an apparatus for controlling measurement according to an embodiment of the present disclosure. As shown in FIG. 5, the apparatus for controlling measurement includes a receiving unit 501 and a determining unit 502.

The receiving unit 501 is configured to receive a first control parameter from a network device.

The determining unit 502 is configured to: based on a signal quality of a first cell and the first control parameter, determine at least one of: whether a CLI measurement configuration is valid, or whether to perform a CLI measurement, here the CLI measurement refers to that the terminal measures an SRS of another terminal.

In an implementation, the first control parameter is a first measurement threshold.

The determining unit 502 is configured to measure a signal quality of a serving cell; when the signal quality of the serving cell is less than the first measurement threshold, perform CLI measurement for a CLI measurement configuration; or when the signal quality of the serving cell is greater than or equal to the first measurement threshold, stop CLI measurement for a CLI measurement configuration.

In an implementation, the first control parameter is a second measurement threshold, herein the second measurement threshold is associated with a cell identity of a neighboring cell.

The determining unit 502 is configured to measure a signal quality of a neighboring cell; when the signal quality of the neighboring cell is greater than or equal to the second measurement threshold, determine that the CLI measurement configuration associated with the cell identity is valid; or when the signal quality of the neighboring cell is less than the second measurement threshold, determine that the CLI measurement configuration associated with the cell identity is invalid.

In an implementation, the determining unit 502 is further configured to perform CLI measurement for the CLI measurement configuration when the CLI measurement configuration is valid; or stop the CLI measurement for the CLI measurement configuration when the CLI measurement configuration is invalid.

The signal quality includes at least one of an RSRP, an RSRQ or an SINR.

Those skilled in the art will appreciate that the descriptions of the above-described apparatus for controlling measurement of the embodiments of the present disclosure may be understood with reference to the descriptions of the method for controlling measurement of the embodiments of the present disclosure.

Figure 6:
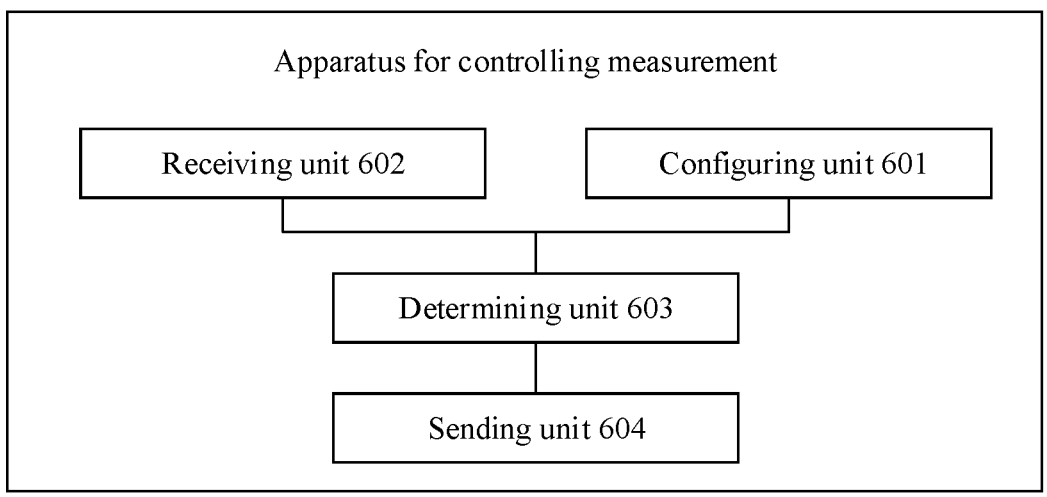
FIG. 6 is a second schematic structural diagram of an apparatus for controlling measurement according to an embodiment of the present disclosure.

FIG. 6 is a second schematic structural diagram of an apparatus for controlling measurement according to an embodiment of the present disclosure. As shown in FIG. 6, the apparatus for controlling measurement includes a configuring unit 601, a receiving unit 602, and a determining unit 603.

The configuring unit 601 is configured to configure a CLI measurement configuration for a terminal.

The receiving unit 602 is configured to receive a measurement result from the terminal.

The determining unit 603 is configured to determine whether to deactivate or activate the CLI measurement configuration according to the measurement result.

In an implementation, the CLI measurement configuration includes at least one SRS resource configuration, each of the at least one SRS resource configuration is associated with at least one of a cell identity or an SRS index.

In an implementation, the SRS index is unique within the CLI measurement configuration or is unique within the cell identity.

In an implementation, the receiving unit 602 is configured to receive a measurement result of a serving cell sent by the terminal.

The determining unit 603 is configured to: when the measurement result of the serving cell is less than a first measurement threshold, determine to activate the CLI measurement configuration; or when the measurement result of the serving cell is greater than or equal to a first measurement threshold, determine to deactivate the CLI measurement configuration.

In an implementation, the receiving unit 602 is configured to receive a measurement result of a neighboring cell sent by the terminal.

The determining unit 603 is configured to: when a signal quality of the neighboring cell is greater than or equal to a second measurement threshold, determine to activate the CLI measurement configuration; or when a signal quality of the neighboring cell is less than a second measurement threshold, determine to deactivate the CLI measurement configuration.

In an implementation, the measurement result includes a measurement result of at least one of the following signal quality: an RSRP, an RSRQ or an SINR.

In an implementation, the apparatus further includes a sending unit 604.

The sending unit 604 is configured to send a deactivation instruction or an activation instruction of the CLI measurement configuration to the terminal. The deactivation instruction or the activation instruction is carried in one of an RRC signaling, an MAC CE, or a PDCCH.

In an implementation, the deactivation instruction or the activation instruction carries at least one of an identifier of a CLI measurement configuration, a cell identity, or an SRS index.

Those skilled in the art will appreciate that the descriptions of the above-described apparatus for controlling measurement of the embodiments of the present disclosure may be understood with reference to the descriptions of the method for controlling measurement of the embodiments of the present disclosure.

Figure 7:
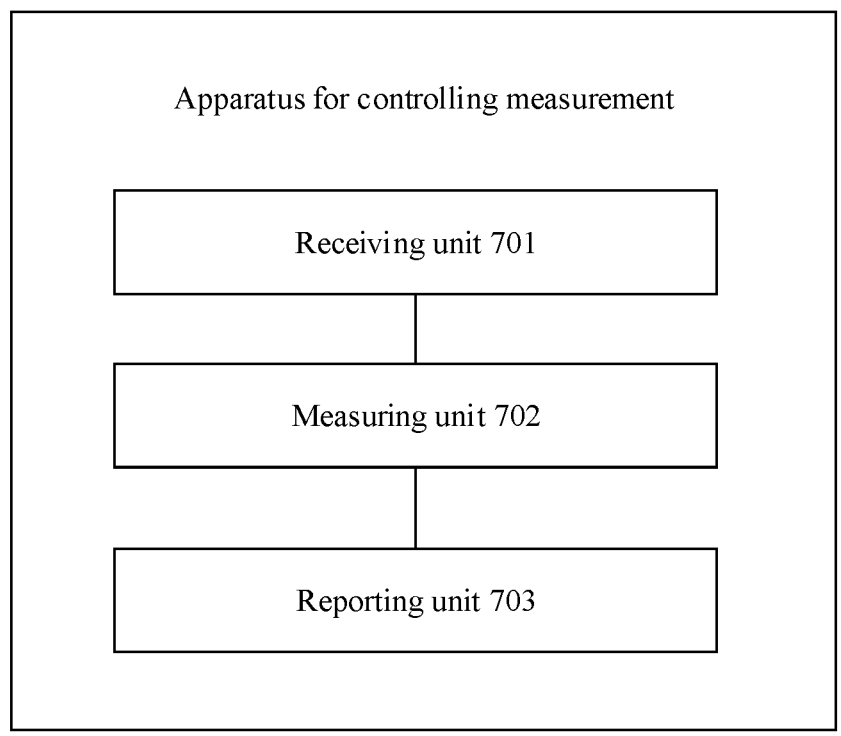
FIG. 7 is a third schematic structural diagram of an apparatus for controlling measurement according to an embodiment of the present disclosure.

FIG. 7 is a third schematic structural diagram of an apparatus for controlling measurement according to an embodiment of the present disclosure. As shown in FIG. 7, the apparatus for controlling measurement includes a receiving unit 701 and a measuring unit 702.

The receiving unit 701 is configured to receive a CLI measurement configuration from a network device, herein the CLI measurement configuration includes at least one SRS resource configuration, each of the at least one SRS resource configuration is associated with at least one of a cell identity or an SRS index.

The measuring unit 702 is configured to perform CLI measurement according to the CLI measurement configuration, herein the CLI measurement refers to that a terminal measures an SRS of another terminal.

In an implementation, in the CLI measurement configuration, each SRS resource corresponds to a respective measurement object, herein the measurement object includes an SRS resource configuration.

In an implementation, in the CLI measurement configuration, all SRS resources correspond to a measurement object, herein the measurement object includes a set of SRS resource configurations.

In an implementation, in the CLI measurement configuration, all SRS resources associated with a cell correspond to a measurement object, herein the measurement object includes a set of SRS resource configurations.

In an implementation, the measuring unit 702 is configured to perform measurement according to an SRS resource configuration to obtain a measurement result of an SRS.

The apparatus further includes a reporting unit 703, configured to: when the measurement result meets a threshold condition configured by the network device, wait for time T; and when the measurement result still meets the threshold condition within the time T, report the measurement result to the network device, herein a value of the T is greater than or equal to 0.

In an implementationr, the content reported by the reporting unit 703 to the network device includes at least one of a measurement result of an SRS-RSRP, a measurement result of an SRS-RSRQ or a measurement result of an SRS-SINR associated with an identifier of each CLI measurement configuration.

In an implementation, the measuring unit 702 is configured to perform measurement according to the set of SRS resource configurations to obtain measurement results of a set of SRSs.

The apparatus further includes a reporting unit 703, configured to: when a measurement result of at least one SRS in the measurement results of the set of SRSs meets the threshold condition configured by the network device, wait for time T; and if the measurement result still meets the threshold condition within the time T, report the measurement result to the network device, herein a value of the T is greater than or equal to 0.

In an implementation, the content reported by the reporting unit 703 to the network device includes:
at least one of a measurement result of an SRS-RSRP, a measurement result of an SRS-RSRQ or a measurement result of an SRS-SINR associated with each SRS index; or
a list of SRS indexes whose measurement results meet a threshold condition configured by the network device.

In an implementation, the content reported by the reporting unit 703 to the network device further includes a cell identity associated with a measurement result of the SRS, and the cell identity is identical to a cell identity associated with an SRS resource configuration corresponding to the measurement result.

In an implementation, the content reported by the reporting unit 703 to the network device further includes a measurement identifier associated with the measurement configuration of the SRS.

In an implementation, the measuring result meets a threshold condition configured by the network device includes that:

the measurement result is greater than or equal to a first threshold configured by the network device; or, the measurement result is less than or equal to a first threshold configured by the network device.

Those skilled in the art will appreciate that the descriptions of the above-described apparatus for controlling measurement of the embodiments of the present disclosure may be understood with reference to the descriptions of the method for controlling measurement of the embodiments of the present disclosure.

Figure 8:
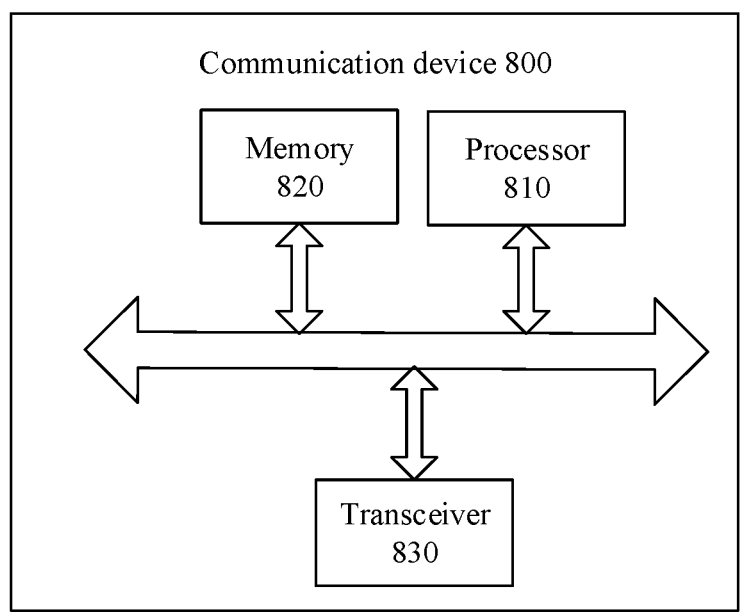
FIG. 8 is a schematic structural diagram of a communication device according to an embodiment of the present disclosure.

FIG. 8 is a schematic structural diagram of a communication device 800 according to an embodiment of the present disclosure. The communication device may be a terminal or a network device. The communication device 800 shown in FIG. 8 includes a processor 810 that may invoke and run computer programs from a memory to perform the method in the embodiments of the present disclosure.

In an example, as shown in FIG. 8, the communication device 800 may further include a memory 820. The processor 810 may invoke and run computer programs from the memory 820 to perform the method in the embodiments of the present disclosure.

The memory 820 may be a separate device independent of the processor 810 or may be integrated within the processor 810.

In an example, as shown in FIG. 8, the communication device 800 may further include a transceiver 830 that may be controlled by the processor 810 to communicate with other devices, in particular to send information or data to other devices or receive information or data sent by other devices.

The transceiver 830 may include a transmitter and a receiver. The transceiver 830 may further include an antenna, the number of antennas may be one or more.

In an example, the communication device 800 may be specified as the network device of the embodiments of the present disclosure, and the communication device 800 may implement a corresponding flow implemented by the network device in each method of the embodiments of the present disclosure. For brevity, details are not described herein.

In an example, the communication device 800 may be specified as the mobile terminal/terminal of the embodiments of the present disclosure, and the communication device 800 may implement the corresponding flow implemented by the mobile terminal/terminal in the methods of the embodiments of the present disclosure. For brevity, details are not described herein.

Figure 9:
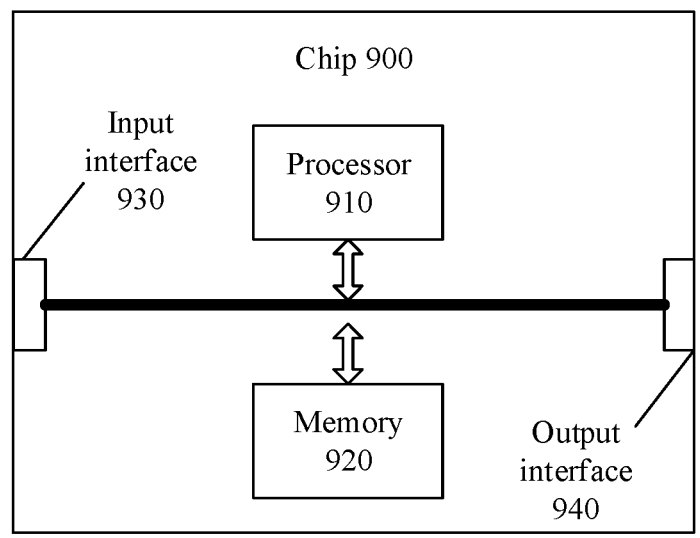
FIG. 9 is a schematic structural diagram of a chip according to an embodiment of the present disclosure.

FIG. 9 is a schematic structural diagram of a chip according to an embodiment of the present disclosure. The chip 900 shown in FIG. 9 includes a processor 910 that may invoke and run computer programs from a memory to perform the method in the embodiments of the present disclosure.

In an example, as shown in FIG. 9, the chip 900 may further include a memory 920. The processor 910 may invoke and run computer programs from the memory 920 to perform the method in the embodiments of the present disclosure.

The memory 920 may be a separate device independent of the processor 910 or may be integrated within the processor 910.

In an example, the chip 900 may further include an input interface 930. The processor 910 may control the input interface 930 to communicate with other devices or chips, and specifically may acquire information or data sent by the other devices or chips.

In an example, the chip 900 may further include an output interface 940. The processor 910 may control the output interface 940 to communicate with other devices or chips, and in particular may output information or data to other devices or chips.

In an example, the chip may be applied to the network device in the embodiments of the present disclosure, and the chip may implement a corresponding flow implemented by the network device in each method in the embodiments of the present disclosure. For brevity, details are not described herein.

In an example, the chip may be applied to the mobile terminal/terminal in the embodiments of the present disclosure, and the chip may implement the corresponding flow implemented by the mobile terminal/terminal in the methods of the embodiments of the present disclosure. For brevity, details are not described herein.

It should be understood that the chip mentioned in the embodiments of the present disclosure may also be referred to as a system level chip, a system chip, a chip-on system or the like.

Figure 10:
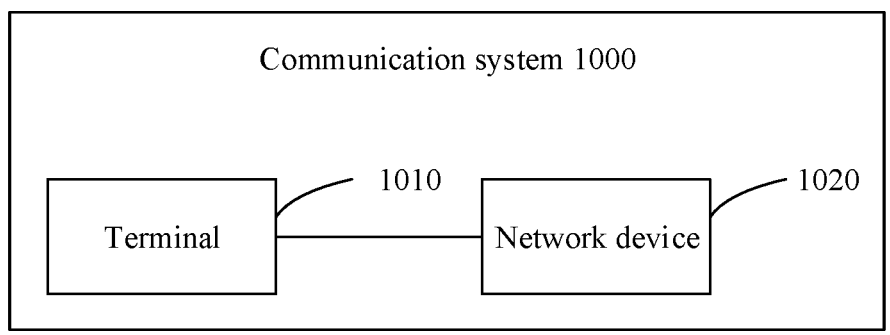
FIG. 10 is a schematic block diagram of a communication system according to an embodiment of the present disclosure.

FIG. 10 is a schematic block diagram of a communication system 1000 according to an embodiment of the present disclosure. As shown in FIG. 10, the communication system 1000 includes a terminal 1010 and a network device 1020.

The terminal 1010 may be configured to implement corresponding functions implemented by the terminal in the methods described above, and the network device 1020 may be configured to implement corresponding functions implemented by the network device in the methods described above.

It should be understood that the processor of the embodiments of the present disclosure may be an integrated circuit chip having signal processing capability. In implementation, the operations of the above method embodiments may be accomplished by integrated logic circuitry of hardware in a processor or instructions in the form of software. The processor may be a general purpose processor, a digital signal processor (DSP), an application specific integrated circuit (ASIC), a field programmable gate array (FPGA) or other programmable logic devices, a discrete gate or transistor logic device, or a discrete hardware component. The methods, operations, and logical block diagrams disclosed in the embodiments of the present disclosure may be implemented or performed. The general purpose processor may be a microprocessor or the processor may be any conventional processor or the like. The operations of the method disclosed in connection with the embodiments of the present disclosure may be directly performed by a hardware decoding processor, or performed by a combination of hardware in the decoding processor and a software module. The software module may be located in a storage medium mature in the art, such as a random access memory, a flash memory, a read-only memory, a programmable read-only memory, or an electrically erasable programmable memory, a register, or the like. The storage medium is located in the memory, and the processor reads the information in the memory and completes the operations of the methods in combination with the hardware.

It will be understood that the memory in the embodiments of the present disclosure may be a volatile memory or a non-volatile memory, or may include both volatile and non-volatile memory. Herein the non-volatile memory may be a read only memory (ROM), a programmable ROM (PROM), an Erasable PROM (EPROM), an Electrically EPROM (EEPROM) or a flash memory. The volatile memory may be a Random Access Memory (RAM) that functions as an external cache. By way of example, but not limitation, many forms of RAM may be used, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM, (SLDRAM), and a Direct Rambus RAM (DR RAM). It should be noted that the memories of the systems and methods described herein are intended to include, but are not limited to, these and any other suitable types of memories.

It should be understood that the memory described above is exemplary but not limiting, for example, the memory in the embodiments of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a Direct Rambus RAM (DR RAM), or the like. That is, the memory in the embodiments of the present disclosure is intended to include, but is not limited to, these and any other suitable types of memory.

Embodiments of the present disclosure further provide a computer-readable storage medium for storing a computer program.

In an example, the computer-readable storage medium may be applied to the network device in the embodiments of the present disclosure, and the computer program causes a computer to perform the corresponding flow implemented by the network device in the methods in the embodiments of the present disclosure. For brevity, details are not described herein.

In an example, the computer-readable storage medium may be applied to the mobile terminal/terminal in the embodiments of the present disclosure, and the computer program causes the computer to perform the corresponding flow implemented by the mobile terminal/terminal in the methods of the embodiments of the present disclosure. For brevity, details are not described herein.

Embodiments of the present disclosure further provide a computer program product including one or more computer program instructions.

In an example, the computer program product may be applied to the network device in the embodiments of the present disclosure, and the computer program instructions cause the computer to perform the corresponding flow implemented by the network device in the methods in the embodiments of the present disclosure. For brevity, details are not described herein.

In an example, the computer program product may be applied to the mobile terminal/terminal in the embodiments of the present disclosure, and the computer program instructions cause the computer to perform the corresponding flow implemented by the mobile terminal/terminal in the methods of the embodiments of the present disclosure. For brevity, details are not described herein.

Embodiments of the present disclosure further provide a computer program.

In an embodiment, the computer program may be applied to the network device in the embodiments of the present disclosure. When the computer program runs on a computer, the computer performs the corresponding flow implemented by the network device in the methods in the embodiments of the present disclosure. For brevity, details are not described herein.

In an embodiment, the computer program may be applied to the mobile terminal/terminal in the embodiments of the present disclosure. When the computer program runs on a computer, the computer performs the corresponding flow implemented by the mobile terminal/terminal in the methods in the embodiments of the present disclosure. For brevity, details are not described herein.

Those of ordinary skill in the art will appreciate that the units and algorithm operations of the examples described in connection with the embodiments disclosed herein can be implemented in electronic hardware, or a combination of computer software and electronic hardware. Whether these functions are performed in hardware or software depends on the specific application and design constraints of the technical solution. A person skilled in the art may implement the described functions using different methods for each particular application, but such implementation should not be considered beyond the scope of the present disclosure.

Those skilled in the art will clearly understand that for the convenience and brevity of the description, for the specific working process of the system, apparatus and unit described above, reference may be made to the corresponding process in the foregoing method embodiments, and details are not described herein again.

In the several embodiments provided herein, it should be understood that the disclosed systems, apparatus, and methods may be implemented in other ways. For example, the apparatus embodiments described above are merely illustrative. For example, the division of the units is merely a logical function division, and may be implemented in other ways. For example, a plurality of units or components may be combined or integrated into another system, or some features may be ignored or not performed. In an embodiment, the displayed or discussed coupling or direct coupling or communication connection may be implemented via some interfaces, indirect coupling or communication connection among devices or units, and may be in electrical, mechanical or other form.

The units described as separate units may or may not be physically separate, and the units displayed as units may or may not be physical units, i.e. may be located in one place, or may be distributed over a plurality of network units. Some or all of the units may be selected according to actual needs to achieve the objectives of the solutions of the present embodiment.

In addition, functional units in various embodiments of the present disclosure may be integrated into one processing unit, or each unit may exist physically separated, or two or more units may be integrated into one unit.

The functions may be stored in a computer-readable storage medium if they are implemented as software functional units and sold or used as stand-alone products. Based on such an understanding, the technical solutions of the present disclosure essentially or part of the contribution to the prior art or part of the technical solutions may be embodied in the form of a software product stored in a storage medium, including several instructions for causing a computer device (which may be a personal computer, a server, a network device, or the like) to perform all or part of the operations of the methods described in the embodiments of the present disclosure. The foregoing storage medium includes a USB flash drive, a removable hard disk, a read-only memory (ROM), a random access memory (RAM), a magnetic disk, an optical disc, or any other medium that can store program code.

The foregoing descriptions are merely specific embodiments of the present disclosure, but the protection scope of the present disclosure is not limited thereto. Any change or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A method for controlling measurement, comprising:
receiving, by a terminal, a cross-link interference (CLI) measurement configuration from a network device, wherein the CLI measurement configuration comprises at least one sounding reference signal (SRS) resource configuration, each of the at least one SRS resource configuration being associated with at least one of a cell identity or an SRS index used for identifying an SRS corresponding to each of the at least one SRS resource configuration, wherein in the CLI measurement configuration, all SRS resources correspond to a measurement object, the measurement object comprising the at least one SRS resource configuration; and
performing, by the terminal, a CLI measurement according to the at least one SRS resource configuration of the CLI measurement configuration to obtain measurement results of a set of SRSs, wherein the CLI measurement refers to that the terminal measures an SRS of another terminal,
wherein when a measurement result of at least one SRS in the measurement results of the set of SRSs meets a threshold condition configured by the network device, waiting for time T;
if the measurement result still meets the threshold condition within the time T, reporting, by the terminal, the measurement result to the network device, wherein a value of the T is greater than 0.

2. The method of claim 1, wherein a content reported by the terminal to the network device comprises one of:
at least one of a measurement result of an SRS-RSRP, a measurement result of an SRS-RSRQ or a measurement result of an SRS-SINR associated with each SRS index; or
a list of SRS indexes whose measurement results meet a threshold condition configured by the network device.

3. The method of claim 1, wherein a content reported by the terminal to the network device further comprises a cell identity associated with the measurement result of the SRS, the cell identity being identical to a cell identity associated with the SRS resource configuration corresponding to the measurement result.

4. The method of claim 1, wherein a content reported by the terminal to the network device further comprises a measurement identifier associated with the measurement configuration of the SRS.

5. The method of claim 1, wherein the measurement result meets a threshold condition configured by the network device comprises one of:
the measurement result is greater than or equal to a first threshold configured by the network device; or
the measurement result is less than or equal to a first threshold configured by the network device.

6. A terminal, comprising:
a processor; and
a memory for storing a computer program,
wherein the processor is configured to:
receive, through a transceiver, a cross-link interference (CLI) measurement configuration from a network device, wherein the CLI measurement configuration comprises at least one sounding reference signal (SRS) resource configuration, each of the at least one SRS resource configuration being associated with at least one of a cell identity or an SRS index used for identifying an SRS corresponding to each of the at least one SRS resource configuration, wherein in the CLI measurement configuration, all SRS resources correspond to a measurement object, the measurement object comprising the at least one SRS resource configuration; and
perform a CLI measurement according to the at least one SRS resource configuration of the CLI measurement configuration to obtain measurement results of a set of SRSs, wherein the CLI measurement refers to that the terminal measures an SRS of another terminal,
wherein the processor is further configured to:
when a measurement result of at least one SRS in the measurement results of the set of SRSs meets a threshold condition configured by the network device, wait for time T; and
if the measurement result still meets the threshold condition within the time T, report the measurement result to the network device, wherein a value of the T is greater than 0.

7. The terminal of claim 6, wherein a content reported to the network device comprises one of:
at least one of a measurement result of an SRS-RSRP, a measurement result of an SRS-RSRQ or a measurement result of an SRS-SINR associated with each SRS index; or
a list of SRS indexes whose measurement results meet a threshold condition configured by the network device.

8. The terminal of claim 6, wherein a content reported to the network device further comprises a cell identity associated with the measurement result of the SRS, the cell identity being identical to a cell identity associated with the SRS resource configuration corresponding to the measurement result.

9. The terminal of claim 6, wherein a content reported to the network device further comprises a measurement identifier associated with the measurement configuration of the SRS.

10. The terminal of claim 6, wherein the measurement result meets a threshold condition configured by the network device comprises one of:
the measurement result is greater than or equal to a first threshold configured by the network device; or
the measurement result is less than or equal to a first threshold configured by the network device.

11. A non-transitory computer-readable storage medium having stored therein a computer program that, when executed by a computer, causes the computer to perform operations comprising:
receiving a cross-link interference (CLI) measurement configuration from a network device, wherein the CLI measurement configuration comprises at least one sounding reference signal (SRS) resource configuration, each of the at least one SRS resource configuration being associated with at least one of a cell identity or an SRS index used for identifying an SRS corresponding to each of the at least one SRS resource configuration, wherein in the CLI measurement configuration, all SRS resources correspond to a measurement object, the measurement object comprising the at least one SRS resource configuration; and performing a CLI measurement according to the at least one SRS resource configuration of the CLI measurement configuration to obtain measurement results of a set of SRSs, wherein the CLI measurement refers to that a terminal measures an SRS of another terminal, wherein the operations further comprise:

when a measurement result of at least one SRS in the measurement results of the set of SRSs meets a threshold condition configured by the network device, wait for time T; and if the measurement result still meets the threshold condition within the time T, report the measurement result to the network device, wherein a value of the T is greater than 0.

12. The non-transitory computer-readable storage medium of claim 11, wherein a content reported to the network device comprises one of:

at least one of a measurement result of an SRS-RSRP, a measurement result of an SRS-RSRQ or a measurement result of an SRS-SINR associated with each SRS index; or a list of SRS indexes whose measurement results meet a threshold condition configured by the network device.

13. The non-transitory computer-readable storage medium of claim 11, wherein a content reported to the network device further comprises a measurement identifier associated with the measurement configuration of the SRS.

14. The non-transitory computer-readable storage medium of claim 11, wherein the measurement result meets a threshold condition configured by the network device comprises one of:

the measurement result is greater than or equal to a first threshold configured by the network device; or the measurement result is less than or equal to a first threshold configured by the network device.

* * * * *